US011894667B2

(12) United States Patent
Bacchini et al.

(10) Patent No.: US 11,894,667 B2
(45) Date of Patent: Feb. 6, 2024

(54) METHOD AND EQUIPMENT FOR THE INSTALLATION OF A POWER CABLE IN A TUNNEL

(71) Applicant: Prysmian S.p.A., Milan (IT)

(72) Inventors: Marco Bacchini, Bernareggio (IT); Simone Manfredi, Milan (IT); Mario Genovesi, Cremona (IT)

(73) Assignee: Prysmian S.p.A., Milan (IT)

( * ) Notice: Subject to any disclaimer, the term of this patent is extended or adjusted under 35 U.S.C. 154(b) by 256 days.

(21) Appl. No.: 17/397,425

(22) Filed: Aug. 9, 2021

(65) Prior Publication Data
US 2022/0052515 A1 Feb. 17, 2022

(30) Foreign Application Priority Data
Aug. 11, 2020 (IT) .......................... 102020000019975

(51) Int. Cl.
*H02G 9/08* (2006.01)
(52) U.S. Cl.
CPC ..................................... *H02G 9/08* (2013.01)
(58) Field of Classification Search
CPC ............ H02G 1/06; H02G 1/08; H02G 1/088; H02G 1/081; H02G 1/083; H02G 9/08; H02G 9/06; H02G 9/065
See application file for complete search history.

(56) References Cited

U.S. PATENT DOCUMENTS

| 5,518,339 A | * | 5/1996 | Shimizu | ................. | G02B 6/483 |
| | | | | | 405/303 |
| 2008/0230657 A1 | * | 9/2008 | Booth | ................... | F16L 3/1008 |
| | | | | | 248/63 |

FOREIGN PATENT DOCUMENTS

| GB | 2383200 A | | 6/2003 | | |
| GB | 2468883 A | * | 9/2010 | ............. | H02G 1/088 |
| GB | 2468883 A | | 9/2010 | | |
| GB | 2554873 A | * | 4/2018 | ................ | F16L 1/00 |
| GB | 2554873 A | | 4/2018 | | |
| KR | 20170061932 A | * | 6/2017 | | |
| KR | 20170061932 A | | 6/2017 | | |
| KR | 101915432 B1 | | 11/2018 | | |

* cited by examiner

*Primary Examiner* — Tyrone V Hall, Jr.
(74) *Attorney, Agent, or Firm* — Slater Matsil, LLP

(57) ABSTRACT

An embodiment describes a method for installing a single power cable span in a tunnel having an entrance and an exit. The method includes positioning a head portion of the single power cable span near the entrance and laying the single power cable span in the tunnel past the exit. The laying of the single power cable span comprises repeating a plurality of sub-steps until the head portion reaches an endpoint outside the tunnel. The plurality of sub-steps includes connecting a trolley at the entrance in a slidable manner on a rail longitudinally extending along the tunnel between the entrance and the exit, joining the trolley to a pulling rope and to the single power cable span, and moving the trolley along the rail by pulling the pulling rope by a predetermined length. Another embodiment relates to an equipment for installing a single cable span in a tunnel.

19 Claims, 7 Drawing Sheets

METHOD AND EQUIPMENT FOR THE INSTALLATION OF A POWER CABLE IN A TUNNEL

CROSS-REFERENCE TO RELATED APPLICATIONS

This application claims the benefit of Italian Patent Application No. 102020000019975 filed on Aug. 11, 2020, which application is hereby incorporated herein by reference.

TECHNICAL FIELD

The present disclosure relates to a method and an equipment for the installation of a power cable in a tunnel.

BACKGROUND

Underground cables, when compared to equivalent overhead lines, are more expensive because they have to be bigger to reduce the electrical resistance and the heat produced, they need special insulation and/or cable cooling, generally provided by forced air ventilation or water cooling. Furthermore, the transitions between overhead lines and underground cables require termination points. This results in higher costs.

However, underground cables help in ensuring uninterrupted power supply that is hitherto less common in overhead systems due to, e.g., heavy winds and gales, failure of supporting structures, etc. Underground cables can transmit power across densely populated areas where land is costly or environmentally or aesthetically sensitive. Therefore, in certain areas, the benefits of underground cables outweigh disadvantages of undergrounding.

Among the cable underground installation methods, tunnel installation, whose depth is typically about 25-30 meters, is generally used in urban locations where direct bury installation would cause unacceptable disruption. This has the advantage that other underground services such as water and sewerage are unaffected, and there is a larger freedom of selecting the cable path, which, for example, can cross rivers or railways.

The positioning of a single span of a power cable, in particular high voltage cable, into tunnels presents difficulties. The cable is supplied on drums which typically do not fit into the tunnel, so that the cable has to be fed into the tunnel lengthways. Generally, a single cable span is shorter than the tunnel where it is to be deployed, thus a plurality of joints is requested with increase of cost, installation time, and safety issues. Furthermore, joints are weak points of a cable installation where faults may occur. Additionally, since, as explained, high voltage cables for undergrounding are heavy (for example, a 400 kV cable weighs about 40 kg/m), deploying a single cable for a length greater than 2 km presents problems in terms of managing of the supplier drum and pulling force exerted on the cable.

GB 2 383 200 A relates to cable installation in tunnels. The cable is supplied on a drum and motorised rollers are used to lead the cable to the top of the tunnel. Inside the tunnel, the cable is supported from a support beam by beam rollers which support a cable hanger. The beam rollers can roll along the support beam, carrying the cable with them. As the cable is advanced, beam rollers are provided at the tunnel opening. The cable is fully unrolled and supported along its entire length by the support beam. Once a 1 km length is positioned at the desired position, it is moved to clips on the side wall. The lengths of cable are joined after they have been moved to the clips.

GB 2 468 883 A relates to cable installation in tunnels. Known cable installation methods include so-called hand pulling, nose pulling and bond pulling. Bond pulling is most suitable for long runs of heavy cables. The cable is advanced along the tunnel in a temporary position suspended from the tunnel roof. As the cable is advanced along the tunnel, rollers are fitted over an I-beam with cable hangers that support the cable. The rollers are spaced by Kevlar bars so that the regular spacing of the rollers is maintained when they are pulled along the I-beam from the entry point of the cable.

SUMMARY

An embodiment describes a method for installing a single power cable span in a tunnel having an entrance and an exit. The method comprises positioning a head portion of the single power cable span near the entrance and laying the single power cable span in the tunnel past the exit. The laying of the single power cable span comprises repeating a plurality of sub-steps until the head portion reaches an endpoint outside the tunnel. The plurality of sub-steps comprises connecting a trolley at the entrance in a slidable manner on a rail longitudinally extending along the tunnel between the entrance and the exit, joining the trolley to a pulling rope and to the single power cable span, and moving the trolley along the rail by pulling the pulling rope by a predetermined length. After moving the trolley by the predetermined length, connecting another trolley on the rail and joining the another trolley to the pulling rope and moving the another trolley along the rail by pulling the pulling rope by the predetermined length, and disconnecting, at the exit, the trolley from the pulling rope and from the single power cable span and removing it from the rail. The method includes when the head portion reaches the endpoint, locking at least the trolley nearest to the exit on the rail inside the tunnel.

An embodiment describes an equipment for installing a single power cable span in a tunnel. The equipment comprises a rail to be fixedly installed longitudinally in the tunnel; a pulling device and a pulling rope driven by the pulling device; and a plurality of trolleys slidably couplable to the rail. Each of the plurality of trolleys comprises a device for forming a releasable connection between one of the plurality of trolleys and the pulling rope, and a device for forming a releasable connection between one of the plurality of trolleys and the single power cable span.

BRIEF DESCRIPTION OF THE DRAWINGS

Further characteristics and advantages will be more apparent from the following description of some embodiments given as a way of an example with reference to the enclosed drawings in which.

DETAILED DESCRIPTION OF ILLUSTRATIVE EMBODIMENTS

Figure 1A:
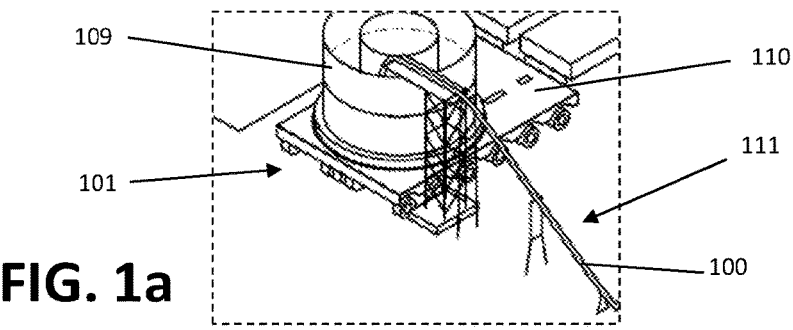
FIGS. 1a-1c show exemplary steps for carrying a HV cable near a tunnel entrance according to an embodiment of the method of the present disclosure.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

Embodiments of this application provide a method and equipment for the installation of a power cable in a tunnel where a long cable span, particularly longer than 2 km, can be deployed without the need of joints.

Embodiments include a method for the installation of a single power cable span in a tunnel where the cable is clamped successively by a plurality of trolleys both sliding along a rail installed in the tunnel during the installation and acting as fixed supports for the cable once the installation is completed, wherein during the installation the cable single span is moved along the tunnel from end to end thereof by pulling said trolleys through a pulling rope fixed thereto. No pulling forces are directly applied on the cable head and there is no need of intermediate pulling aids along the tunnel. The cable is installed in the final position attached to the trolleys fixed in the tunnel, with no need of cable handling inside the tunnel. Therefore, the overall process is quick and easy equipment is needed. Similarly, the cable substitution, for example in case of failure, is also quick and simple.

Accordingly, the present disclosure relates to a method for the installation of a single power cable span in a tunnel having an entrance and an exit, the method comprising the steps of: positioning a head portion of the cable span near the tunnel entrance; laying the single cable span in the tunnel past the tunnel exit, wherein the step of laying the single cable span in the tunnel comprises repeating the following sub-steps until the cable head portion reaches an endpoint outside the tunnel: at the tunnel entrance connecting a trolley in a slidable manner on a rail longitudinally extending along the tunnel between the tunnel entrance and the tunnel exit; joining the trolley to a pulling rope and to the single cable span; moving the trolley along the rail by pulling the pulling rope; after a predetermined length joining another trolley; at the tunnel exit detaching the trolley from the pulling rope and from the cable and removing it from the rail; when the cable head portion reached the endpoint, locking at least the trolley nearest to the tunnel exit on the rail inside the tunnel.

According to an embodiment, at least a number of trolleys are locked on the rail inside the tunnel. All of the trolleys inside the tunnel can be stationarily locked on the rail.

According to an embodiment, the present method further comprises a step of dragging the cable head portion to the endpoint by an auxiliary pulling rope when the cable head portion reaches a predetermined position outside the tunnel and is disconnected from the trolley.

According to an embodiment, when the cable head portion reached a predetermined end point outside of the tunnel, a predetermined sag is imparted to the single cable span inside the tunnel by: locking to the rail the trolley nearest to the tunnel exit; disconnecting the trolley nearest to the tunnel exit from the pulling rope; and pulling the upward trolleys by the pulling rope until the cable portions between all of the trolleys inside the tunnel are imparted with the predetermined sag.

According to an alternative embodiment, a predetermined sag is imparted to the cable span while it advances along the tunnel. This process comprises providing a sagging apparatus provided near the tunnel entrance and operating it to push down a cable portion substantially equidistant from two trolleys, thus providing the predetermined sag.

According to another aspect, the present disclosure relates to an equipment for the installation of a single power cable span in a tunnel, comprising: at least one rail to be fixedly installed longitudinally in the tunnel; a pulling device and a pulling rope driven by the pulling device; and a plurality of trolleys slidably couplable to the rail, each of said trolleys comprising a device for the releasable connection of the trolley to the pulling rope and a device for the releasable connection of the trolley to the cable.

In an embodiment, the present equipment comprises an auxiliary pulling device and an exit auxiliary pulling rope driven by the auxiliary pulling device connectable to the head portion of the single cable span.

In the present description and claims, as high voltage (HV) cable it is meant a cable rated for a voltage above 30 kV.

Using the method and the equipment of the present disclosure it is possible to install a long single cable span of a power cable without the need of joints connecting subsequent cable spans. Therefore, the installation is easier and cheaper, and the installed cable is more reliable.

With reference to the attached Figures, the present disclosure describes a method and equipment to position a single span of HV cable 100 from a starting point 101 (FIG. 1a) to an end point 102 (FIG. 30, wherein part of the cable path is in a tunnel 103 and the remaining parts are outside of the tunnel. In the case depicted, the tunnel 103 is under the ground level and the starting point 101 and the end point 102 are at the ground level. The cable path comprises an entrance shaft 104 (FIG. 1c) and an exit shaft 105 (FIG. 2c), respectively in communication with a tunnel entrance 106 and a tunnel exit 107.

The method of installation of the single cable span 100 in the tunnel 103 comprises the step of positioning the head portion 108 (FIG. 1c) of the cable 100 near the tunnel entrance 106. This step can comprise one or more of the sub-steps as described below.

As shown in FIG. 1a, the single cable span 100 can be delivered at the starting point 101 rolled in a basket or turntable 109, for example carried by a vehicle 110, such as a wheeled vehicle or even a boat depending on the position of the starting point 101. The single cable span 100 can be initially unloaded from the basket 109 using, for example, a pick-up arm (not shown in the figures) picking up the cable head portion 108 and moving it in a transition structure 111 guiding and holding the cable 100 from the basket 109 to the entrance shaft 104. During the movement of the cable 100 along the transition structure 11, the cable 100 is progressively unloaded from the basket 109.

Figure 1B:
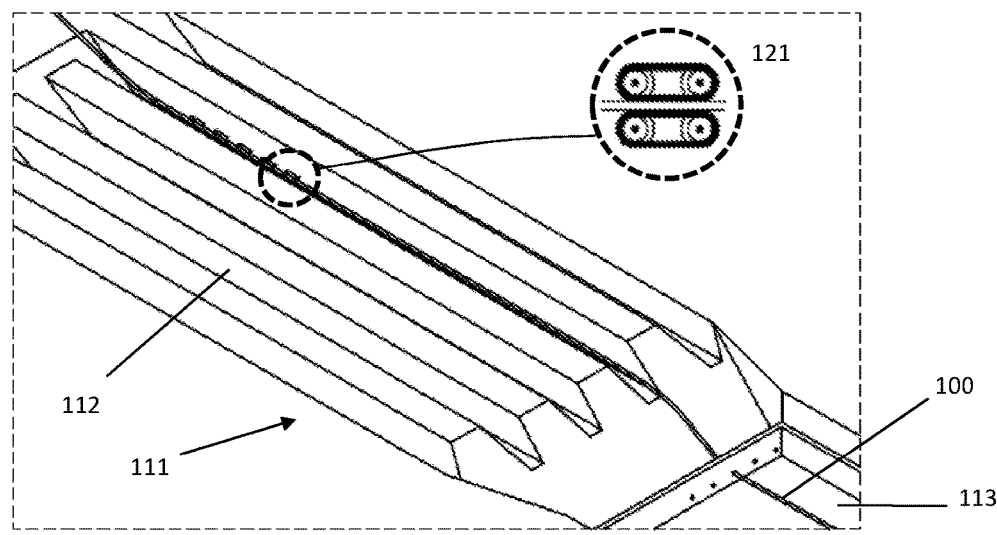

In an embodiment shown in FIG. 1b, the transition structure 111 can comprise one or more trenches 112 optionally housing rollers, chutes, pushers 121, for moving, guiding and/or easing the advance of the cable towards the entrance shaft 104. The transition structure 11 can also comprise a joint chamber 113 for the connection of the cable span to a cable of the network, once deployed.

Figure 1C:
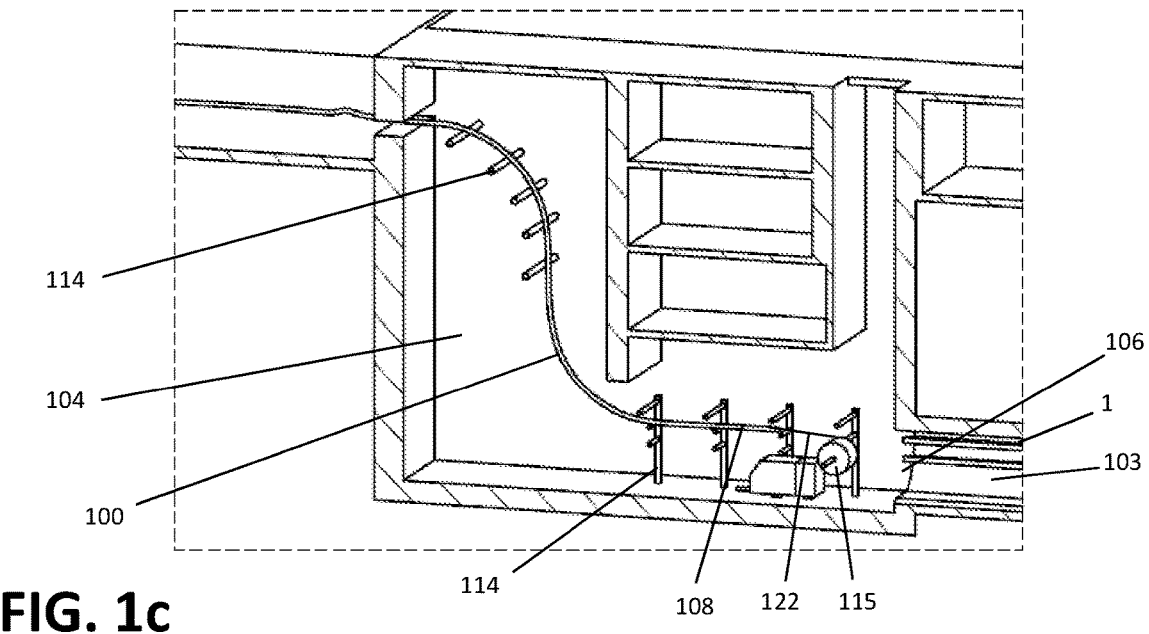

In an embodiment, as shown in FIG. 1c, a plurality of first supports 114, for example made of steel, are installed in the entrance shaft 104. The first supports 114 can have rollers for guiding the cable.

The step of positioning the head portion of the cable 103 near the tunnel entrance 106 can further comprise the sub-step of installing an auxiliary pulling device, such as an auxiliary entrance winch 115, at the bottom of the entrance shaft 104 to pull the cable head portion 108 near the tunnel entrance 106 through an entrance auxiliary rope 122. The above-mentioned pushers 121 and the auxiliary entrance winch 115 can be driven in a synchronized manner.

The method further comprises a step of laying the single cable span 100 in the tunnel 103. To this purpose, an installation equipment is provided in the tunnel 103 and near the tunnel entrance 106 and exit 107, for example in the entrance shaft 104 and in the exit shaft 105, as will be described in detail below.

Figure 2A:
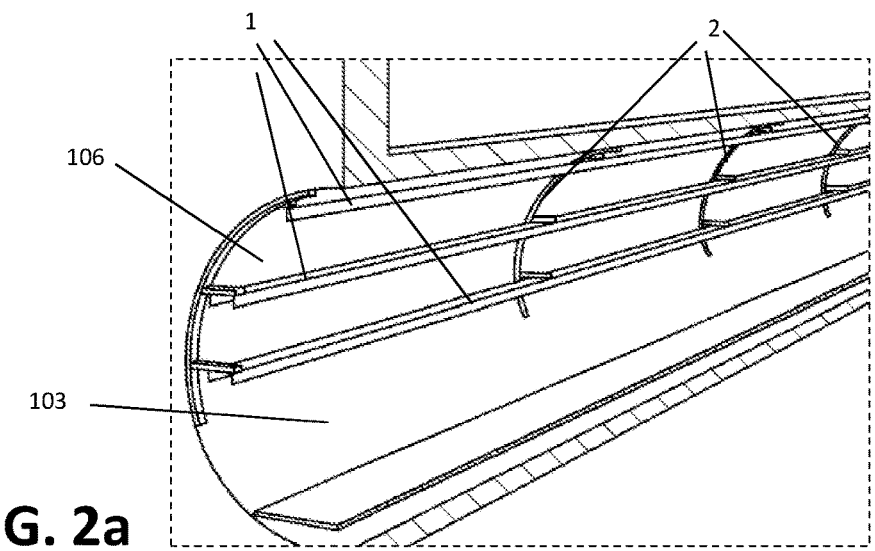
FIGS. 2a-2c shows an equipment for the installation of a single span of HV cable in a tunnel according to an embodiment of the present disclosure.

As from FIG. 2a, at least one rail 1 is installed in the tunnel 103, longitudinally extending along the same, from the tunnel entrance 106 to the tunnel exit 107. In an embodiment, one rail 1 is fixed at the tunnel wall for each single cable span 100 to be deployed in the tunnel 103. In case of a plurality of cables to be installed, a corresponding plurality of rails 1, substantially parallel one another, can be installed (as from FIG. 2a), before or after the deployment of a cable span on a rail. In case of a tunnel 103 having circular or semi-circular cross section, for example, the rails 1 are installed to the tunnel wall circumferentially along the cylindrical tunnel wall, parallelly to the longitudinal axis thereof.

In an embodiment, in order to install the rail 1 in the tunnel 103, a plurality of rail support structures 2 for supporting the rails 103 are fixed along the tunnel to the tunnel walls. The rail support structures 2 are, for example, made of steel and can be spaced along the tunnel length of the same distance, for example no more than 9 meters. In an embodiment, the rail support structures 2 are arc-shaped to fit the circular or semi-circular tunnel wall, as shown for example in FIG. 2a. The rails 1 and the rail support structures 2 are fixedly installed in the tunnel 103 because they are used both for laying the single cable span 100 and for supporting the same in the tunnel 103 once the installation is completed, as will be described in more detail in the following.

Figure 2B:
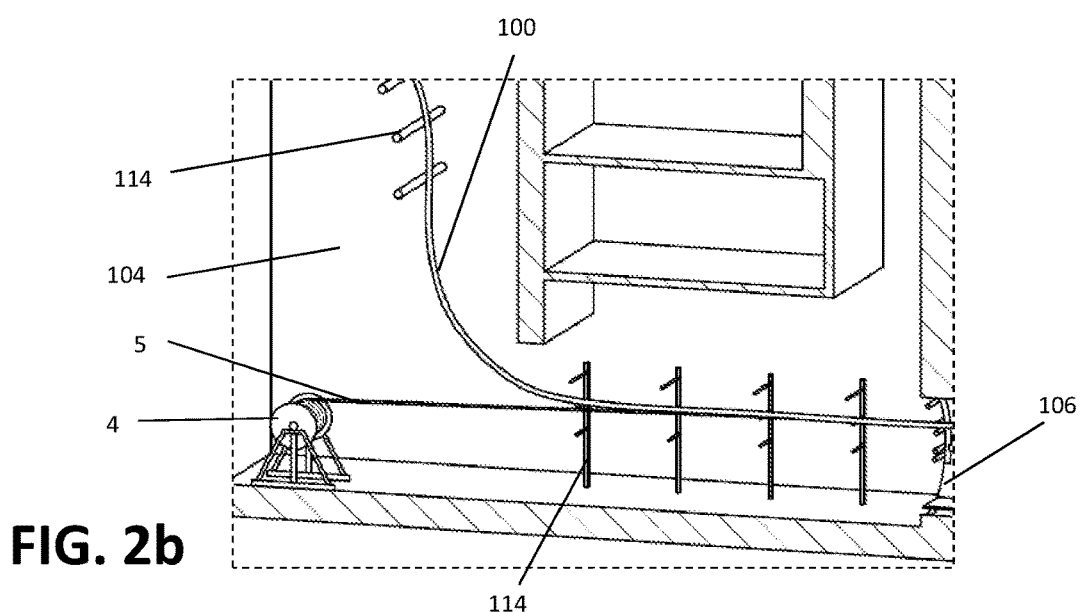
Figure 2C:
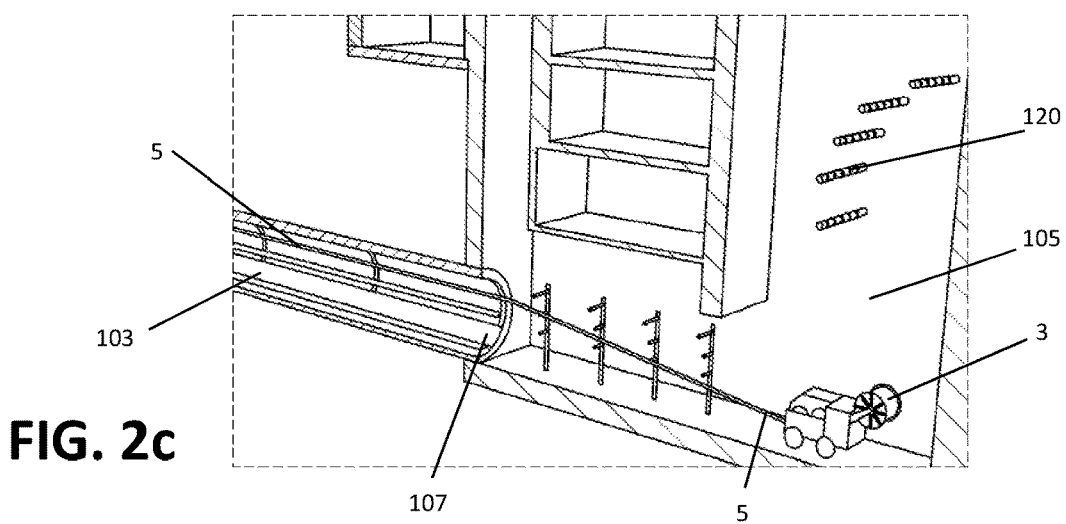

In an embodiment, a pulling device 3, for example comprising a pulling winch, is installed near the tunnel exit 107, for example at the exit shaft 105, as from FIG. 2c. A rope buffer, for example comprising an idle roller 4, is provided near the tunnel entrance 106, for example at the entrance shaft 104, as from FIG. 2b. A pulling rope 5 is stored in the rope buffer, for example is wound in the idle roller 4, and, by extending longitudinally along the tunnel 103, is connected to the pulling winch 3 such that the pulling winch 3 can pull the rope 5 stored in the idle roller 4. In an embodiment, the pulling rope 5 is positioned to extend parallel to and near the rail 1.

Figure 3A:
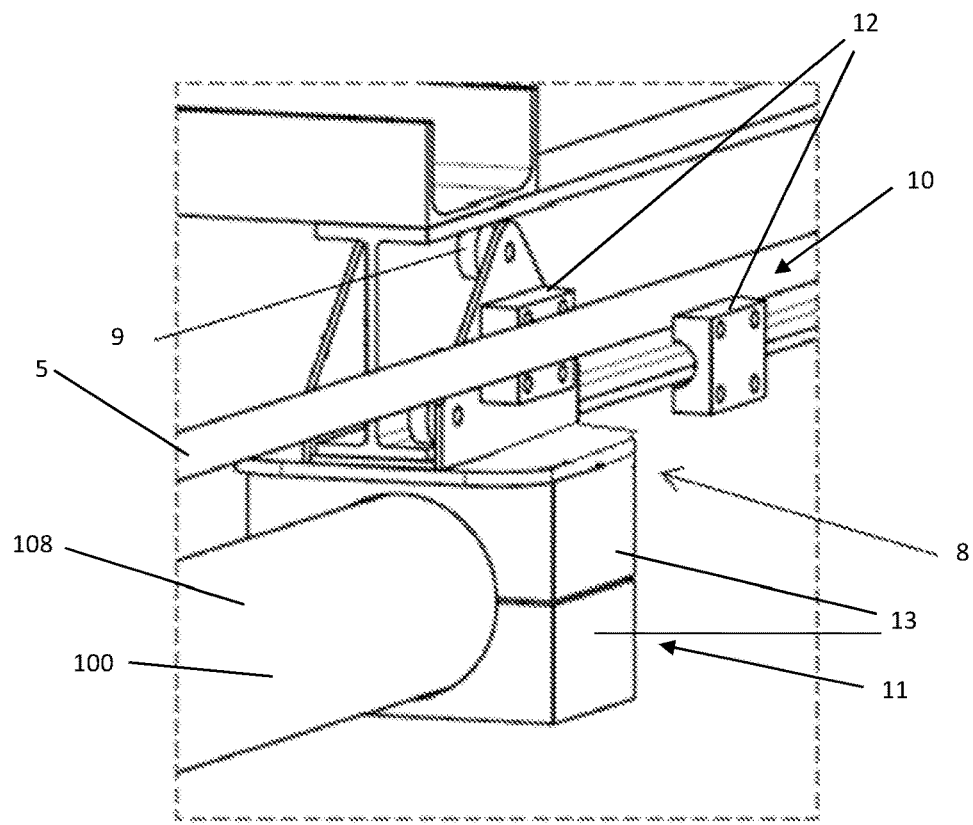
FIGS. 3a-3h shows exemplary steps of a method for the installation of a single span of HV cable in a tunnel according to an embodiment of the present disclosure.

As from FIG. 3a, a first trolley 8 is connected to the rail 1, being slidable thereon, for example at the tunnel entrance 106. In order to minimize the friction with the rail 1, the trolley 8 can comprise bearings 9 with low friction coefficient. In an embodiment, the rail 1 is I-shaped and the bearings 9 engage the I-shaped rail 1 on both sides of the I-shaped rail. Then, the trolley 8 is connected to the rope 5 and to the single cable span 100, in particular to the cable head portion 108, for example in the mentioned order. To this purpose, the trolley 8 comprises a device 10, for example a first clamp, for the releasable connection of the rope 5 to the trolley 8 and a device 11, for example a second clamp, for the releasable connection of the single cable span 100 to the trolley 8 with. The first and second devices 10, ii are designed such that, once connected to the cable 1 and to the rope 5, the trolley 8 can slide along the rail 1 thanks to the pulling force exerted by the pulling rope 5 and can integrally carry the cable 1 with no pulling stress exerted thereon. In an embodiment, the first clamp of the device 10 comprises two first halves 12 for releasably clamping the rope 5 and the second clamp of the device 11 comprises two second halves 13 for releasably clamping the cable 1.

Figure 3B:
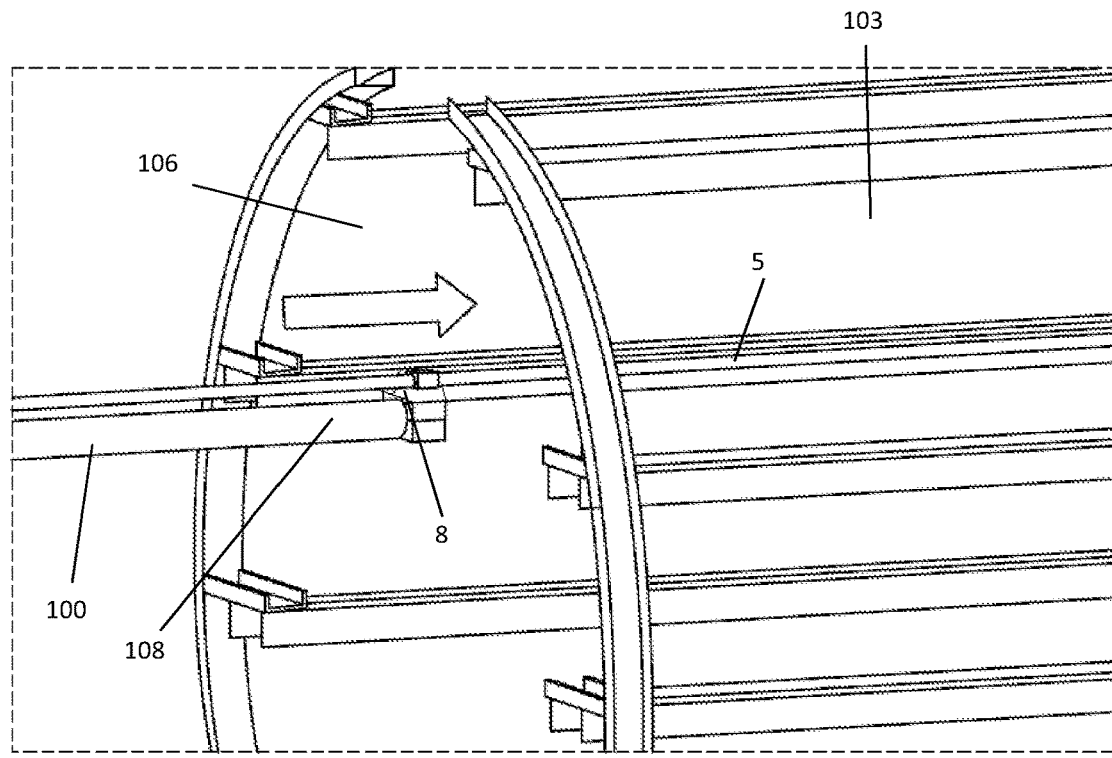
Figure 3C:
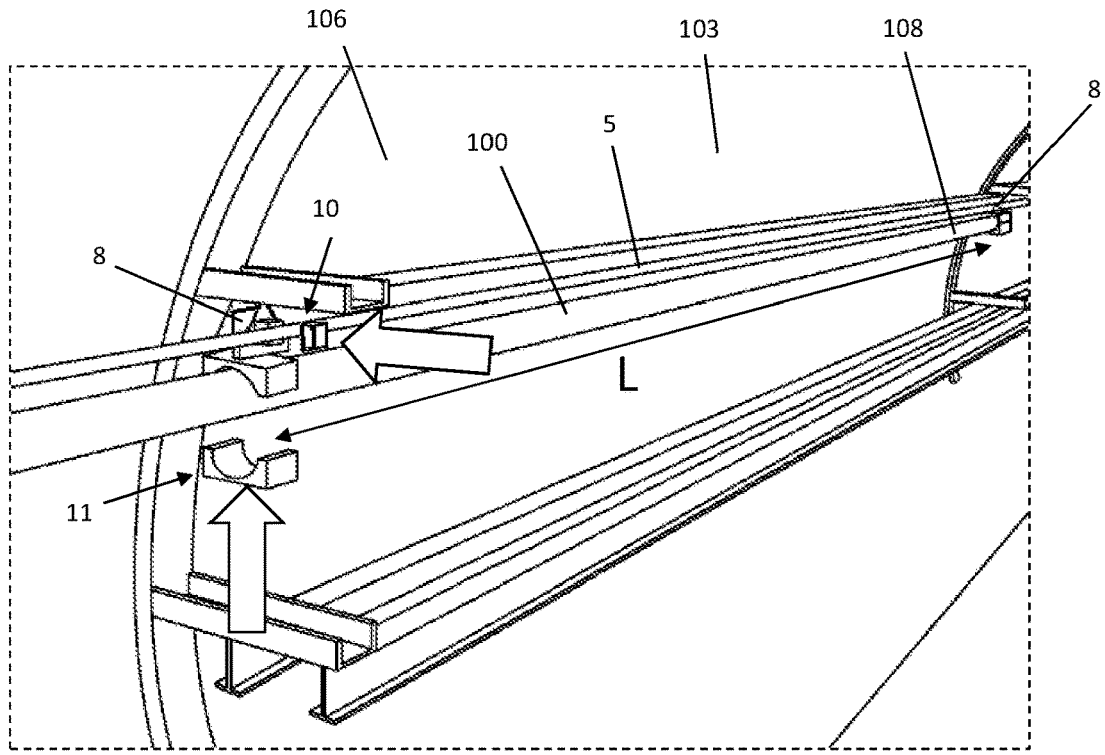

Then, the trolley 8 is moved along the rail 1 by pulling the pulling rope 5, driven by the pulling device 3, and slides along the rail 1 for a predetermined first longitudinal distance L shorter than the rail 1 overall length, as shown in the FIGS. 3b and 3c. During this operation, the single cable span 100 is longitudinally carried along the rail 1 for substantially the same first longitudinal distance L. For example, the above-mentioned predetermined first longitudinal distance L is no longer than 9 meters. A minimum distance can be of 1 meter or less, but the skilled person can appreciate that the shorter the distance L is, the higher the number of trolleys to be used for the cable deployment is, and this implies an increase of the cost and time of installation.

Then, further trolleys 8, having the same features of the first trolley 8, are connected, one after the other, to the rail 1 at the tunnel entrance 106, as shown in FIG. 3c. Then, each further trolley 8 is connected to the rope 5 and to the single cable span 100, as described for the first trolley. Each further trolley 8 is connected to a cable portion at a longitudinal distance from the preceding trolley 8 (the first trolley 8 in the case of FIG. 3c). Then, each further trolley 8 is made to slide along the rail 1 as already described for the first trolley 8, for a predetermined additional longitudinal distance, for example equal to the first longitudinal length L. During this operation, the single cable span 100 longitudinally moves further along the rail 1 for the same distance.

Once the first trolley 8 reaches the rail end near the tunnel exit 107, the cable head portion 108 is detached from the first trolley 8.

Figure 3D:
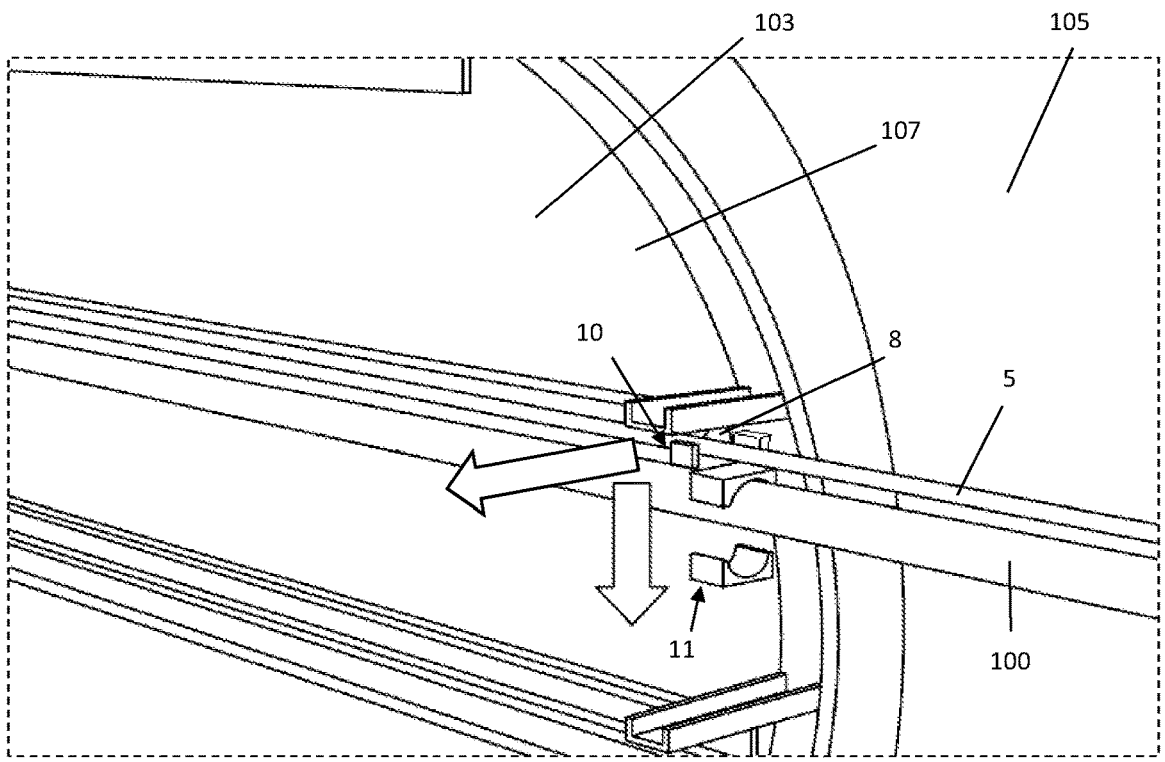
Figure 3E:
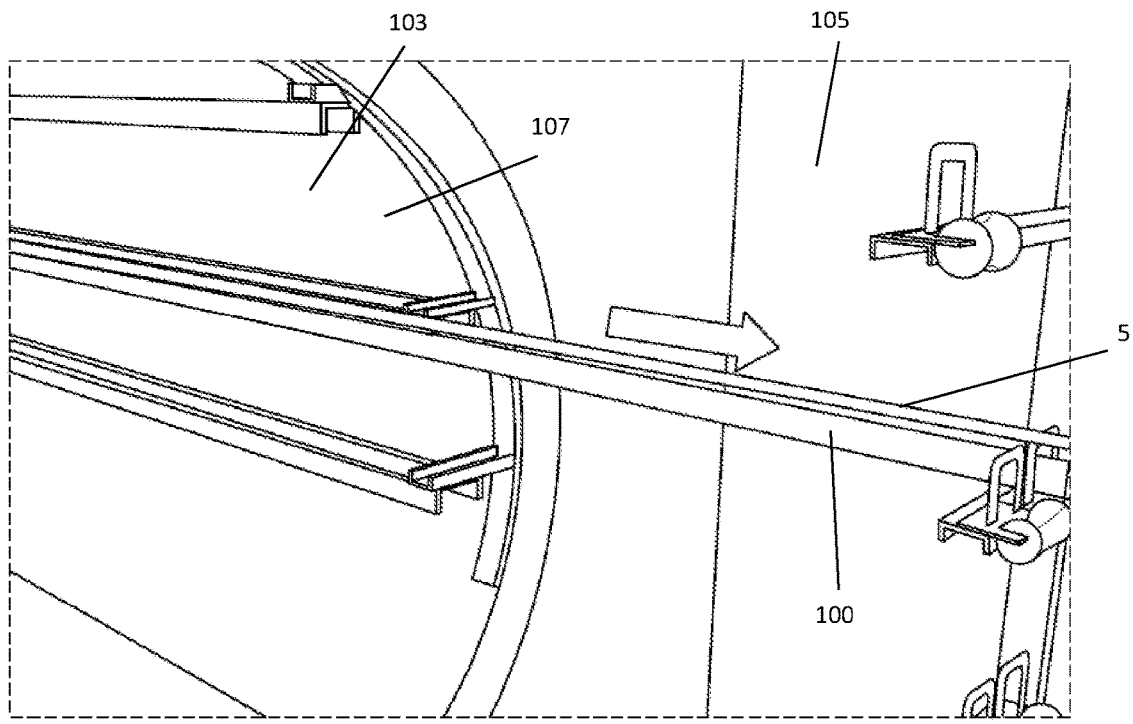
Figure 3F:
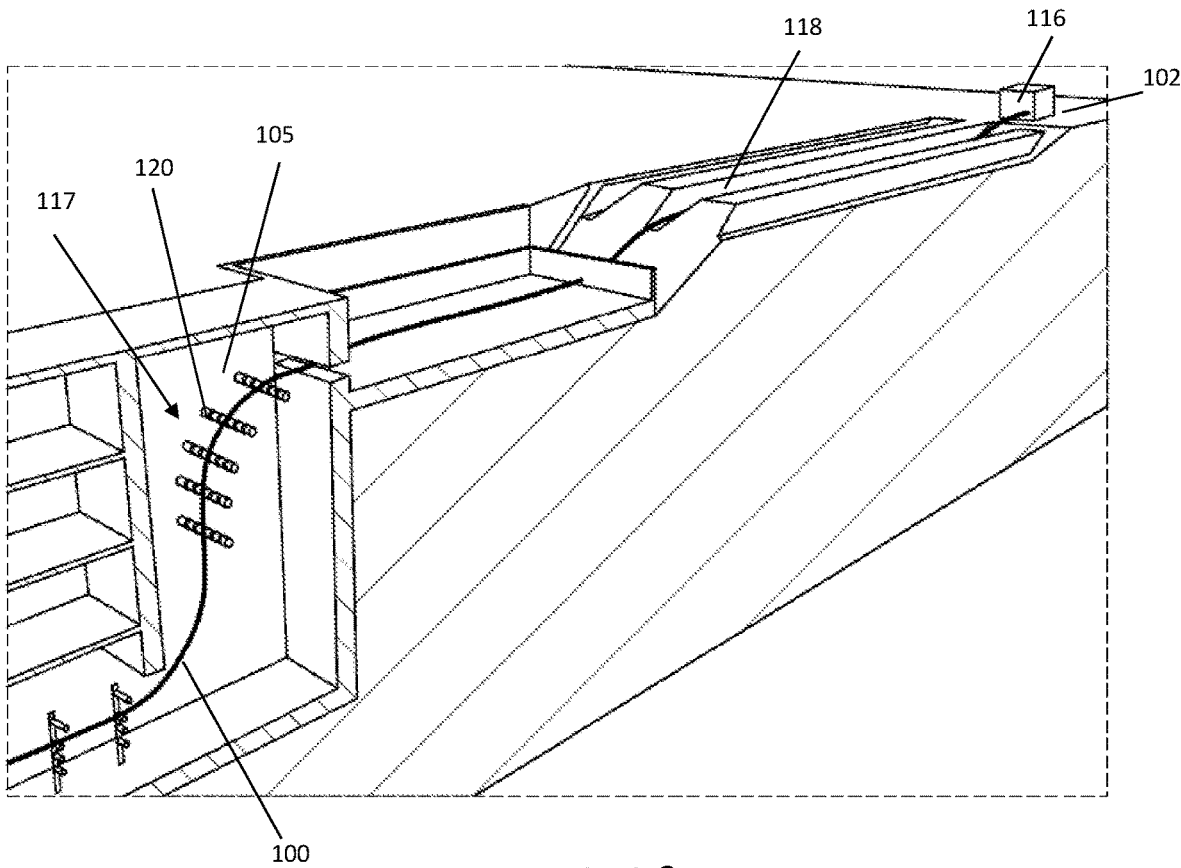

The single cable span 100 is further moved such that the cable head portion 108 is carried to and outside the exit shaft 105, particularly it reaches the overhead end point 102, as from FIG. 3f. During this moving, the cable span 100 is detached from a suitable number of trolleys 8, while at the tunnel entrance 106 the cable span 100 is joint to an equally suitable number of further trolleys 8.

In an embodiment, an auxiliary pulling device, such as an auxiliary exit winch 116, is positioned at the overhead endpoint 102 (FIG. 30. The auxiliary pulling device drives an exit auxiliary pulling rope (not shown in the Figures) connected to the cable head portion 108 to pull the single cable span 100 towards the endpoint 102. The pulling force exerted by the exit auxiliary pulling rope on the cable head portion 108 (and, accordingly, on the single cable span 100)

is partly relieved by the tractive force of the pulling rope 5 still operatively connected to most of the single cable span length.

An exit transition structure 117 guiding and holding the single cable span 100 and the exit auxiliary pulling rope from the tunnel exit 107 through the exit shaft 105 is provided. A second trench 118 can house a part of the exit transition structure 117. The second trench 118 can connect the end point 102 to the exit shaft 105.

In an embodiment, a plurality of second supports 120, for example made of steel, are installed in the exit shaft 105. Analogously to the first supports 114, the second supports 120 can have rollers for guiding the cable head portion 108 and the auxiliary pulling rope.

At the end point 102, cable head portion 108 of the single cable span 100 can be connected to one or more power cables of the electric network by a second joint chamber (not illustrated).

As mentioned above, in order to raise the head portion 108 of the single cable span 100 outside the tunnel 107, the pulling rope 5 and a predetermined number of trolleys 8 are disconnected from the single cable span 100, and the disconnected trolleys 8 are removed from the rail 1 (FIG. 3*d*). Then, as shown in the FIG. 3*e*, both the pulling rope 5 (which keeps on pulling the further trolleys 8 and, accordingly, the single cable span 100 connected thereto) and the exit auxiliary pulling rope (connected to the cable head portion 118) driven by the auxiliary exit winch 116 are pulled, for example in a synchronized manner, until the cable head portion 108 reaches a predetermined position outside the tunnel, for example until it reaches the endpoint 102. Depending on the length of the single cable span 100 to be extracted from the tunnel 103, beside the first trolley 8, further trolleys 8 can be sequentially disconnected from the pulling rope 5 and from the single cable span 100 and removed from the rail 1.

In an embodiment, at least a number or all of the trolleys 8 inside the tunnel 103, once the cable head portion 108 reached the endpoint 102, can be stationarily locked to the rail 1, thus providing a permanent support for the deployed cable span 100. The choice about the number of trolleys 8 to be left into the tunnel 103 can be determined by installation considerations like the cable weight.

According to an embodiment, when the cable head portion reached a predetermined end point outside of the tunnel, the pulling rope is left joined to the trolleys inside the tunnel.

Figure 3G:
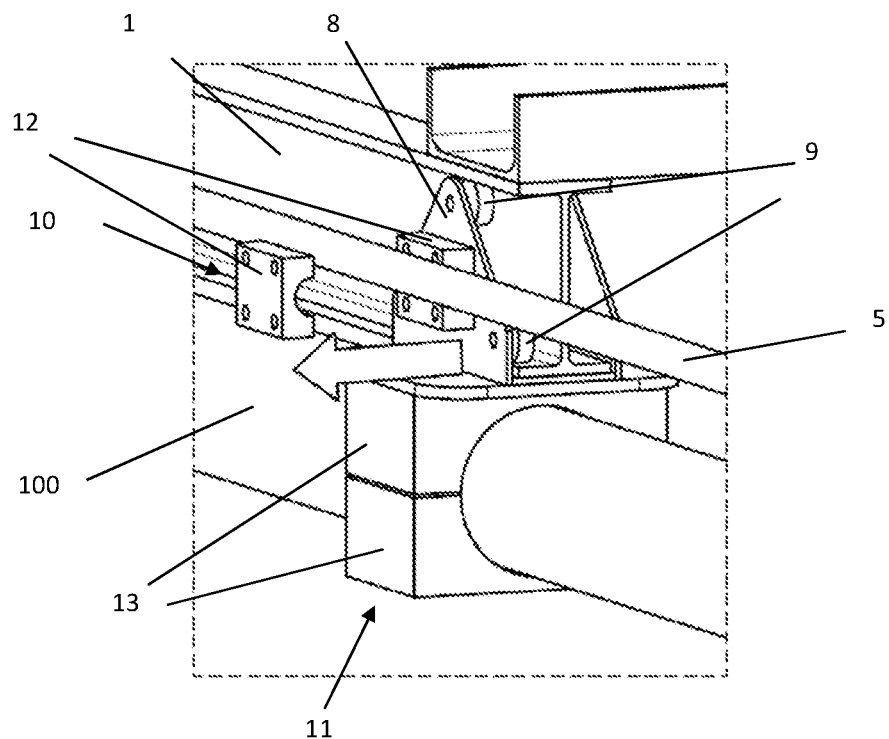
Figure 3H:
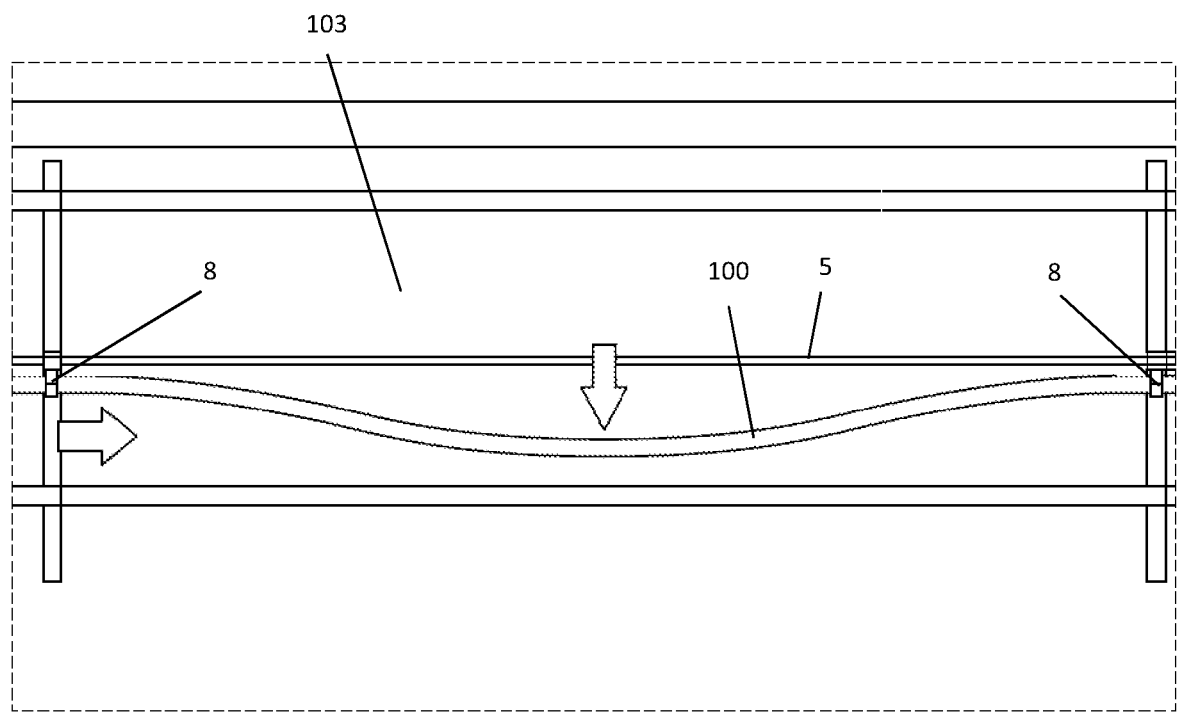
Figure 4:
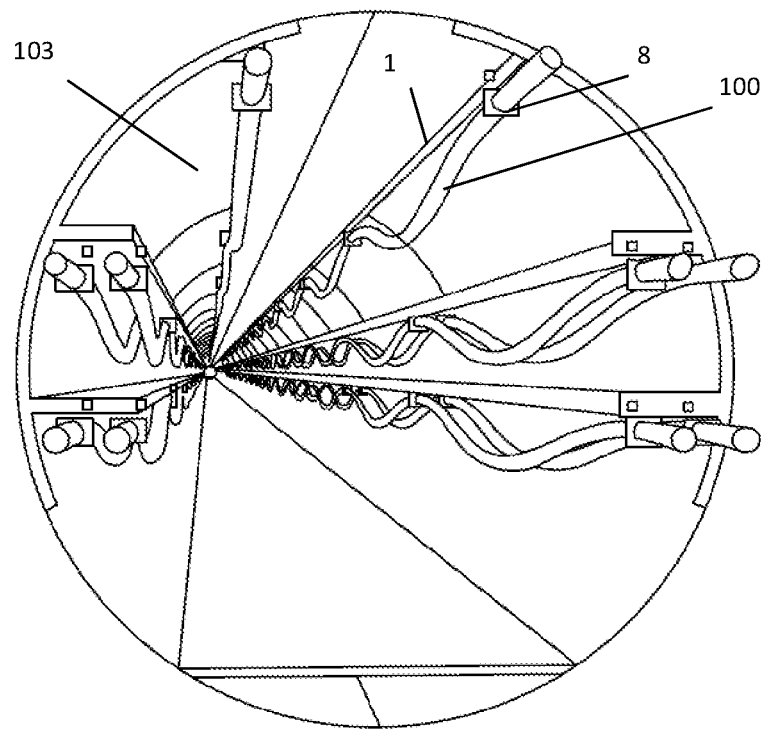
FIG. 4 shows an exemplary configuration of several single spans of HV cables installed in a tunnel using the method and the equipment according to an embodiment of the present disclosure.

In an embodiment, the method further comprises a step of imparting the single cable span 100 with a sagging, as depicted in the FIGS. 3*g*-3*h* and 4. Said step comprises the sub-steps of locking to the rail 1 the trolley 8 nearest to the tunnel exit 107 when the cable head portion 108 has reached a predetermined end point 102 outside the tunnel 103. The locked trolley 8 is disconnected from the rope 5 while maintaining the connection with the single cable span 100, as shown in FIG. 3*g*. The pulling rope 5 is then pulled by the pulling device 3 (as from FIG. 2*c*) such that it pulls all the trolleys 8 still slidable on the rail 1 (not locked thereto) and still connected both to the cable 1 and to the rope 5. This pulling could require the addition of at least one further trolley 8 at the tunnel entrance 106 and its connection to the single cable span 100 and the pulling rope 5. The pulling lasts until the cable portions between all of the trolleys 8 inside the tunnel 103 reach a predetermined sag, as shown in FIG. 3*h*.

In an embodiment, the step of imparting the cable with a predetermined sag further comprises the additional sub-step of applying a vertical load to the above-mentioned cable portions, for example in the middle of the same (central arrow in FIG. 3*h*). In an embodiment, this sub-step is simultaneous to the driving of the pulling rope 5 such that it pulls to slide on the rail 1 the trolley 8 nearest to the locked trolley 8. Then, the trolley 8 nearest to the locked trolley 8 is in turn locked to the rail 1. The procedure is repeated for all of the trolleys 8 inside the tunnel 103.

Figure 5:
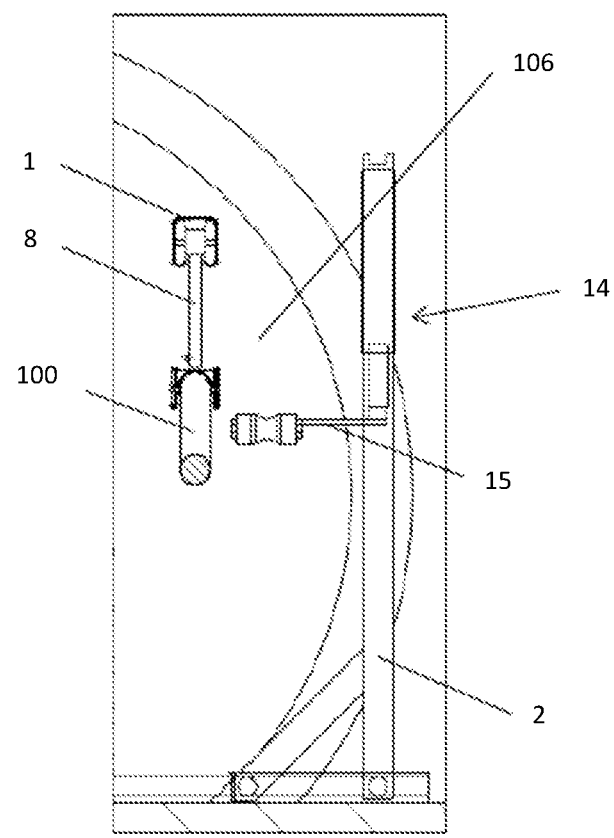
FIG. 5 shows a sagging apparatus of the equipment for the installation of a single span of HV cable in a tunnel according to an embodiment of the present disclosure.

According to an alternative embodiment, a predetermined sag is imparted to the cable span 100 while advancing along the tunnel 103. A sagging apparatus 14 (FIG. 5) is provided inside the tunnel 103 at a distance from the connection point of the trolley 8 to the rail 1 at the tunnel entrance 106, said distance being at least substantially equal to half of the length L. The sagging apparatus 14 comprises a pushing arm 15 which, in stand-by condition, is positioned vertically above the cable span 100. When the center of a cable portion comprised between two trolleys (which are advancing on the rail 1 as pulled by the pulling rope 5) arrives substantially under the pushing arm 15, the latter is lowered operated to push the cable down thus obtaining the predetermined sag. The sagging operation is over when the cable span 100 inside the tunnel 103 is sagged as sought.

As the sagged cable span 100 is moved along the rail 1 by a pulling force exerted on the trolleys 8 bearing it, the sag is maintained during the deployment.

At the end of any of the optional sagging procedures, at least a number or all of the trolleys 8 inside the tunnel 103 once the cable head portion 108 reached the endpoint 102 can be stationarily locked to the rail 1, as already explained above.

When the cable head portion reached a predetermined end point outside of the tunnel, the installation method of the present disclosure is taken as finished. Subsequently, the single cable span so installed can be connected to the power network by, for example, the first and second joint chambers mentioned above.

The final configuration of each single cable span 100 installed according to the present disclosure is depicted in the FIG. 4. In this embodiment, each single cable span 100 is supported by a respective rail 1 and connected to the latter by a plurality of trolleys 8 used for the cable deployment. Therefore, according to the method of the present disclosure, the trolleys 8 and the rails 1 are used both for the installation and for the support of the single cable span 100 at the end of the installation.

What is claimed is:

1. A method for installing a single power cable span in a tunnel having an entrance and an exit, the method comprising:
   positioning a head portion of the single power cable span near the entrance;
   laying the single power cable span in the tunnel past the exit, the laying of the single power cable span comprising repeating a plurality of sub-steps until the head portion reaches an endpoint outside the tunnel, the plurality of sub-steps comprising
      connecting a trolley at the entrance in a slidable manner on a rail longitudinally extending along the tunnel between the entrance and the exit,
      joining the trolley to a pulling rope and to the single power cable span,
      moving the trolley along the rail by pulling the pulling rope by a predetermined length,
      after moving the trolley by the predetermined length, connecting another trolley on the rail and joining the another trolley to the pulling rope and to the single power cable span and moving the another trolley along the rail by pulling the pulling rope by the predetermined length, and disconnecting, at the exit, the trolley from the pulling rope and from the single power cable span and removing it from the rail; and when the head portion reaches the endpoint, locking at least the trolley nearest to the exit on the rail inside the tunnel.

2. The method of claim 1, wherein at least a number of trolleys are locked on the rail inside the tunnel.

3. The method of claim 1, further comprising dragging the head portion to the endpoint by an auxiliary pulling rope when the head portion reaches a predetermined position outside the tunnel and is disconnected from the trolley.

4. The method of claim 1, further comprising imparting a predetermined sag to the single power cable span after the head portion reaches the endpoint.

5. The method of claim 4, wherein imparting the predetermined sag comprises repeating a plurality of sub-steps until each cable portion between two successive trolleys has the predetermined sag, the plurality of sub-steps comprising:
locking the trolley nearest to the exit to the rail inside the tunnel;
disconnecting the trolley nearest to the exit from the pulling rope; and
pulling the remaining trolleys by the pulling rope until the cable portions between all of the trolleys inside the tunnel are imparted with the predetermined sag.

6. The method of claim 5, wherein pulling the remaining trolleys comprising pulling all of the trolleys still slidable on the rail and connected both to the cable and to the pulling rope.

7. The method of claim 4, further comprising connecting at least one further trolley to the single power cable span and the pulling rope at the entrance while pulling the remaining trolleys.

8. The method of claim 1, further comprising imparting a predetermined sag to the single power cable span while advancing along the tunnel.

9. The method of claim 8, wherein the imparting comprises repeating a plurality of sub-steps until each cable portion between two successive trolleys inside the tunnel has the predetermined sag, the plurality of sub-steps comprising:
providing near the entrance a sagging apparatus comprising a pushing arm; and
lowering the pushing arm to push a cable portion between the two successive trolleys and obtaining the predetermined sag.

10. A method for installing a single power cable span in a tunnel having an entrance and an exit, the method comprising:
positioning a head portion of the single power cable span near the entrance; and
laying the single power cable span in the tunnel past the exit, the laying of the single power cable span comprising:
connecting a trolley at the entrance in a slidable manner on a rail longitudinally extending along the tunnel between the entrance and the exit,
joining the trolley to a pulling rope and to the single power cable span, and advancing the trolley along the rail by pulling the pulling rope by a predetermined length,
repeating the connecting, joining, and the advancing with further trolleys,
disconnecting a subset of the trolleys reaching the exit until the head portion reaches an endpoint outside the tunnel, and
when the head portion reaches the endpoint, locking at least one of the further trolleys nearest to the exit on the rail inside the tunnel.

11. The method of claim 10, wherein at least a number of trolleys are locked on the rail inside the tunnel.

12. The method of claim 10, further comprising dragging the head portion to the endpoint by an auxiliary pulling rope when the head portion reaches a predetermined position outside the tunnel and is disconnected from the trolley.

13. The method of claim 10, further comprising imparting a predetermined sag to the single power cable span after the head portion reaches the endpoint, wherein imparting the predetermined sag comprises repeating a plurality of sub-steps until each cable portion between two successive trolleys has the predetermined sag, the plurality of sub-steps comprising:
locking the trolley nearest to the exit to the rail inside the tunnel;
disconnecting the trolley nearest to the exit from the pulling rope; and
pulling the remaining trolleys by the pulling rope until the cable portions between all of the trolleys inside the tunnel are imparted with the predetermined sag.

14. The method of claim 13, wherein pulling the remaining trolleys comprising pulling all of the trolleys still slidable on the rail and connected both to the cable and to the pulling rope.

15. The method of claim 13, further comprising connecting at least one further trolley to the single power cable span and the pulling rope at the entrance while pulling the remaining trolleys.

16. The method of claim 10, further comprising imparting a predetermined sag to the single power cable span while advancing along the tunnel.

17. The method of claim 16, wherein the imparting comprises repeating a plurality of sub-steps until each cable portion between two successive trolleys inside the tunnel has the predetermined sag, the plurality of sub-steps comprising:
providing near the entrance a sagging apparatus comprising a pushing arm; and
lowering the pushing arm to push a cable portion between the two successive trolleys and obtaining the predetermined sag.

18. An equipment for installing a single power cable span in a tunnel, comprising:
a rail to be fixedly installed longitudinally in the tunnel;
a pulling device and a pulling rope driven by the pulling device; and
a plurality of trolleys slidably couplable to the rail, each of the plurality of trolleys comprising a first device for forming a releasable connection between one of the plurality of trolleys and the pulling rope, and a second device for forming a releasable connection between one of the plurality of trolleys and the single power cable span, wherein the first device and the second device comprise clamps with respective halves.

19. The equipment according to claim 18, further comprising an auxiliary pulling device and an auxiliary pulling rope driven by the auxiliary pulling device and connectable to a cable head portion of the single power cable span.

* * * * *